United States Patent
Singh et al.

(10) Patent No.: US 9,569,327 B2
(45) Date of Patent: Feb. 14, 2017

(54) SYSTEM AND METHOD FOR LABELING ALERT MESSAGES FROM DEVICES FOR AUTOMATED MANAGEMENT

(71) Applicants: Anand Singh, Bangalore (IN); Yves Hoppenot, Notre-Dame-de-Mesage (FR); Frederic Roulland, Le Versoud (FR); Pascal Valobra, Webster, NY (US); Victor Ciriza, St Martin d'Uriage (FR)

(72) Inventors: Anand Singh, Bangalore (IN); Yves Hoppenot, Notre-Dame-de-Mesage (FR); Frederic Roulland, Le Versoud (FR); Pascal Valobra, Webster, NY (US); Victor Ciriza, St Martin d'Uriage (FR)

(73) Assignee: XEROX CORPORATION, Norwalk, CT (US)

( * ) Notice: Subject to any disclaimer, the term of this patent is extended or adjusted under 35 U.S.C. 154(b) by 850 days.

(21) Appl. No.: 13/644,187

(22) Filed: Oct. 3, 2012

(65) Prior Publication Data

US 2014/0095144 A1    Apr. 3, 2014

(51) Int. Cl.
*G06F 17/28* (2006.01)
*G06F 11/30* (2006.01)
(Continued)

(52) U.S. Cl.
CPC ....... *G06F 11/3013* (2013.01); *G06F 11/3079* (2013.01); *G06F 11/3086* (2013.01);
(Continued)

(58) Field of Classification Search
CPC .. G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
(Continued)

(56) References Cited

U.S. PATENT DOCUMENTS

| 4,965,772 A * | 10/1990 | Daniel ............... G06F 11/327 704/4 |
| 5,740,231 A * | 4/1998 | Cohn .................. H04L 12/585 370/401 |

(Continued)

FOREIGN PATENT DOCUMENTS

JP    09073315 A  *  3/1997

OTHER PUBLICATIONS

Nakaya, Machine translation JP 09073315 A, 1997 pp. 1-18.*
(Continued)

*Primary Examiner* — Lamont Spooner
(74) *Attorney, Agent, or Firm* — Fay Sharpe LLP (57) ABSTRACT

An alert processing system and method are adapted for processing device alerts. The system includes a routing device in communication with a printer. The routing device receives at least one alert description in a source language transmitted from the printer. The routing device identifies a set of words derived from the alert description related to a condition of the associated device. The routing device compares the set of words, in a target language, to a categorization model and, based on the comparison, categorizes the set of words into to one of a predetermined set of alert categories.

20 Claims, 7 Drawing Sheets

(51) Int. Cl.
H04L 12/18 (2006.01)
G06F 3/12 (2006.01)
G05B 23/02 (2006.01)

(52) U.S. Cl.
CPC ........ *H04L 12/1895* (2013.01); *G05B 23/027* (2013.01); *G06F 3/121* (2013.01); *G06F 3/1203* (2013.01); *G06F 3/1234* (2013.01); *G06F 3/1285* (2013.01); *G06F 17/2881* (2013.01)

(58) Field of Classification Search
USPC ....................................................... 704/1–10
See application file for complete search history.

(56) References Cited

U.S. PATENT DOCUMENTS

| | | | | |
|---|---|---|---|---|
| 6,185,379 | B1* | 2/2001 | Lay | B41J 29/46 399/11 |
| 6,499,117 | B1* | 12/2002 | Tanaka | H04L 41/0654 709/223 |
| 6,622,266 | B1 | 9/2003 | Goddard et al. | |
| 6,718,367 | B1* | 4/2004 | Ayyadurai | H04L 12/585 370/260 |
| 6,747,957 | B1* | 6/2004 | Pithawala | H04L 12/2697 370/252 |
| 6,980,102 | B2 | 12/2005 | Benner et al. | |
| 6,999,990 | B1* | 2/2006 | Sullivan | G06F 9/4446 709/204 |
| 7,139,754 | B2 | 11/2006 | Goutte et al. | |
| 7,359,851 | B2* | 4/2008 | Tong | G06F 17/218 704/8 |
| 7,457,808 | B2 | 11/2008 | Gaussier et al. | |
| 7,472,095 | B2* | 12/2008 | Huelsbergen | G06Q 10/107 706/18 |
| 7,797,303 | B2* | 9/2010 | Roulland | G06F 17/30654 707/708 |
| 7,890,318 | B2* | 2/2011 | Castellani | G06F 11/0733 704/257 |
| 8,086,907 | B1* | 12/2011 | Narin | H04L 41/0604 709/224 |
| 8,291,011 | B2* | 10/2012 | Abu-Hakima | H04L 12/1859 379/37 |
| 2002/0054322 | A1 | 5/2002 | Geelen et al. | |
| 2002/0163427 | A1* | 11/2002 | Eryurek | G05B 23/027 340/500 |
| 2003/0101187 | A1 | 5/2003 | Gaussier et al. | |
| 2005/0210065 | A1* | 9/2005 | Nigam | G06F 17/30705 |
| 2005/0228774 | A1* | 10/2005 | Ronnewinkel | G06F 17/30707 |
| 2005/0267738 | A1* | 12/2005 | Wilkinson | G06F 17/275 704/9 |
| 2006/0015293 | A1* | 1/2006 | Godara | A61B 18/1206 702/183 |
| 2006/0089924 | A1* | 4/2006 | Raskutti | G06F 17/3071 |
| 2006/0143034 | A1* | 6/2006 | Rothermel | G06Q 10/10 705/301 |
| 2006/0227945 | A1* | 10/2006 | Runge | H04M 3/5307 379/88.05 |
| 2007/0005340 | A1 | 1/2007 | Goutte et al. | |
| 2007/0112746 | A1* | 5/2007 | Todhunter | G06F 17/2785 |
| 2007/0192085 | A1* | 8/2007 | Roulland | G06F 17/30684 704/9 |
| 2007/0266424 | A1* | 11/2007 | Haaf | G03G 15/55 726/4 |
| 2008/0091408 | A1* | 4/2008 | Roulland | G06F 17/30672 704/9 |
| 2008/0123605 | A1* | 5/2008 | Cho | H04W 48/04 370/338 |
| 2008/0222501 | A1* | 9/2008 | Travison | G06F 11/366 714/819 |
| 2008/0294423 | A1* | 11/2008 | Castellani | G06F 11/0733 704/4 |
| 2009/0046707 | A1* | 2/2009 | Smires | H04M 7/0069 370/352 |
| 2009/0319456 | A1* | 12/2009 | Consul | G06N 99/005 706/21 |
| 2010/0062835 | A1* | 3/2010 | Hopkins | G07F 17/32 463/25 |
| 2010/0106552 | A1* | 4/2010 | Barillaud | G06Q 10/06 705/7.14 |
| 2010/0274892 | A1* | 10/2010 | Legrand | H04L 63/1408 709/224 |
| 2010/0328707 | A1* | 12/2010 | Miyake | G06F 3/1204 358/1.15 |
| 2010/0332216 | A1* | 12/2010 | Williams | G06F 17/2872 704/4 |
| 2011/0264424 | A1* | 10/2011 | Miwa | G05B 23/0278 703/2 |
| 2011/0270602 | A1* | 11/2011 | Liu | G06F 17/2229 704/8 |
| 2012/0209570 | A1* | 8/2012 | Uchiyama | E02F 9/267 702/183 |
| 2012/0217091 | A1* | 8/2012 | Baillargeon | G08B 21/02 182/18 |
| 2012/0239981 | A1* | 9/2012 | Franke | G06F 11/368 714/38.1 |
| 2013/0262082 | A1* | 10/2013 | McKeeman | G06F 17/30684 704/9 |
| 2013/0305093 | A1* | 11/2013 | Jayachandran | G06F 11/0754 714/37 |

OTHER PUBLICATIONS

Gaussier, et al. "A hierarchical model for clustering and categorizing documents", Advances in Information Retrieval, Proc. of the 24th BCS-IRSG European Colloquium on IR Research (ECIR—02), 2002, Lecture Notes in Computer Science 2291, pp. 229-247.

* cited by examiner

SYSTEM AND METHOD FOR LABELING ALERT MESSAGES FROM DEVICES FOR AUTOMATED MANAGEMENT

BACKGROUND

The present disclosure is directed toward a system and method for handling alerts generated by electromechanical devices. The disclosure also relates to a method for categorizing each alert for purposes of attending to the alert.

A managed printing environment typically has goals of maximizing working time for multiple devices, such as printers, within an organization. In such a networked environment, a number of devices can be managed by a remotely located service provider. Generally, in a fleet of heterogeneous devices, the devices are each programmed to fire status messages, in the form of alerts, to a common server located at a customer site. These alerts are composed of codes and description messages that contain valuable information about current resource levels, device health, and the like. The information is pooled at the customer site and relayed to the remote service provider in batches. A conventional method for managing the device alerts involves an operator at the call center who supervises the received information to monitor the status of the printers and to assist in diagnosing and troubleshooting problems. The operator identifies and resolves any issues that are indicated by the alerts. The operator has to sort through the alerts and schedule the responses, based on a level of importance associated with each alert. The importance can vary based on the type of alert and whether the alert relates to a problem that requires immediate attention.

One problem with this approach is that the importance of an alert or pertinent information contained in the alert can be lost amongst an influx of redundant alerts acquired for one device or by identical alerts for multiple devices at one or multiple customer sites. The task of maintaining knowledge of different sets of rules for attending the alerts can be challenging for an operator that is supervising a diverse fleet of devices.

Therefore, filtering systems have been developed for automatically filtering alerts, such as repetitive alerts, from the batch, based on a set of programmed rules. One problem associated with the rule-based filtering approach is that this may not cover all types of alerts encountered by the system. In this case, the filtering process may not be triggered by certain categories of alerts that should be filtered. For example, business rules are flexible and can vary among different fleets of devices. Different sets of customized rules can be associated with certain customer sites. These rule-based systems can therefore require substantial information and experience to formulate. Furthermore, the differences in business rules among fleets and customer sites can be difficult to maintain, which can affect the categorization of alerts for purposes of attending to an alert. Any changes made to rules should be propagated with proper versioning controls and can be difficult to control. Accordingly, the filtering system is continually updated to categorize alerts based on current and changing rule requirements.

There remains a need for a system and a method that enables a categorization scheme to be automatically updated for purposes of filtering, analyzing, and responding to device alerts. A desired system is adapted to analyze each received alert and update a reference list using a categorization model for an alert description that is determined not to have been previously referenced in the model.

REFERENCES

The following references, the disclosures of which are incorporated herein by reference in their entireties, are mentioned:

US Pub. No. 20030101187, entitled METHODS, SYSTEMS, AND ARTICLES OF MANUFACTURE FOR SOFT HIERARCHICAL CLUSTERING OF CO-OCCURRING OBJECTS, by E. Gaussier, F. Chen and K. Popat.

U.S. Pat. No. 7,139,754, entitled METHOD FOR MULTI-CLASS, MULTI-LABEL CATEGORIZATION USING PROBABILISTIC HIERARCHICAL MODELING, by C. Goutte and E. Gaussier.

U.S. Pat. No. 7,457,808, entitled METHOD AND APPARATUS FOR EXPLAINING CATEGORIZATION DECISIONS, by C. Goutte and E. Gaussier, 2003.

US Pub. No. 20070005340 entitled INCREMENTAL TRAINING FOR PROBABILISTIC CATEGORIZER, by C. Goutte and E. Gaussier.

U.S. Pat. No. 6,622,266 entitled METHOD FOR SPECIFYING PRINTER ALERT PROCESSING, by J. Goddard, et al.

U.S. Pat. No. 6,980,102, entitled ALERT PROCESSING, by B. Benner, et al.

US Pub. No. 20020054322 entitled STEPPED USER ALERTS IN A NETWORKED PRINTER SYSTEM, by J. Geelen, et al.

"A hierarchical model for clustering and categorizing documents" E. Gaussier, C. Goutte, K. Popat, F. Chen. In Advances in Information Retrieval, Proceedings of the 24th BCS-IRSG European Colloquium on IR Research (ECIR—02), Mar. 25-27, 2002. Lecture Notes in Computer Science 2291, pp. 229-247, Springer.

BRIEF DESCRIPTION

In accordance with one aspect of the exemplary embodiment, an alert processing system includes a communication interface adapted to receive at least one alert description in a natural language transmitted by an associated device. A word exclusion module extracts a set of words from the alert description related to a condition of the associated device. An alert categorization module categorizes the alert description into one of a predetermined set of alert categories of a categorization model based on the extracted set of words. A processor implements the modules.

In accordance with another aspect, a method for processing alerts transmitted by at least one device includes receiving at least one alert description in a natural language transmitted by the at least one device. A set of words is extracted from the alert description related to a condition of the associated device. The alert description is categorized into one of a predetermined set of alert categories of a categorization model based on the extracted set of words, and the categorized alert description is output.

In another aspect, a system for processing device alerts transmitted from an associated device includes memory storing a plurality of dictionaries each corresponding to a respective one of a set of source languages. A language module is provided for identifying a source language of an alert description by comparing each of a set of words extracted from the alert description to each of the dictionaries and, where the source language is not a target language, translating the set of words from the source language to the target language. A categorization module is trained on sets of words from labeled prior alert descriptions, the words being in a target language, the categorization module assigning a category to the alert description based on the set of words extracted from the alert description in the target language. An update module updates a referenced alerts list based on the optionally manually validated assigned categories of a plurality of alert descriptions processed by the categorization module, the referenced alerts list being accessible to an associated filtering module for assigning categories to uncategorized alert descriptions without using the categorization module. A processor in communication with the memory implements the modules.

BRIEF DESCRIPTION OF THE DRAWINGS

FIG. 2 is a schematic illustration of a device alert handling system in one aspect of the exemplary embodiment in which

DETAILED DESCRIPTION

Figure 1:
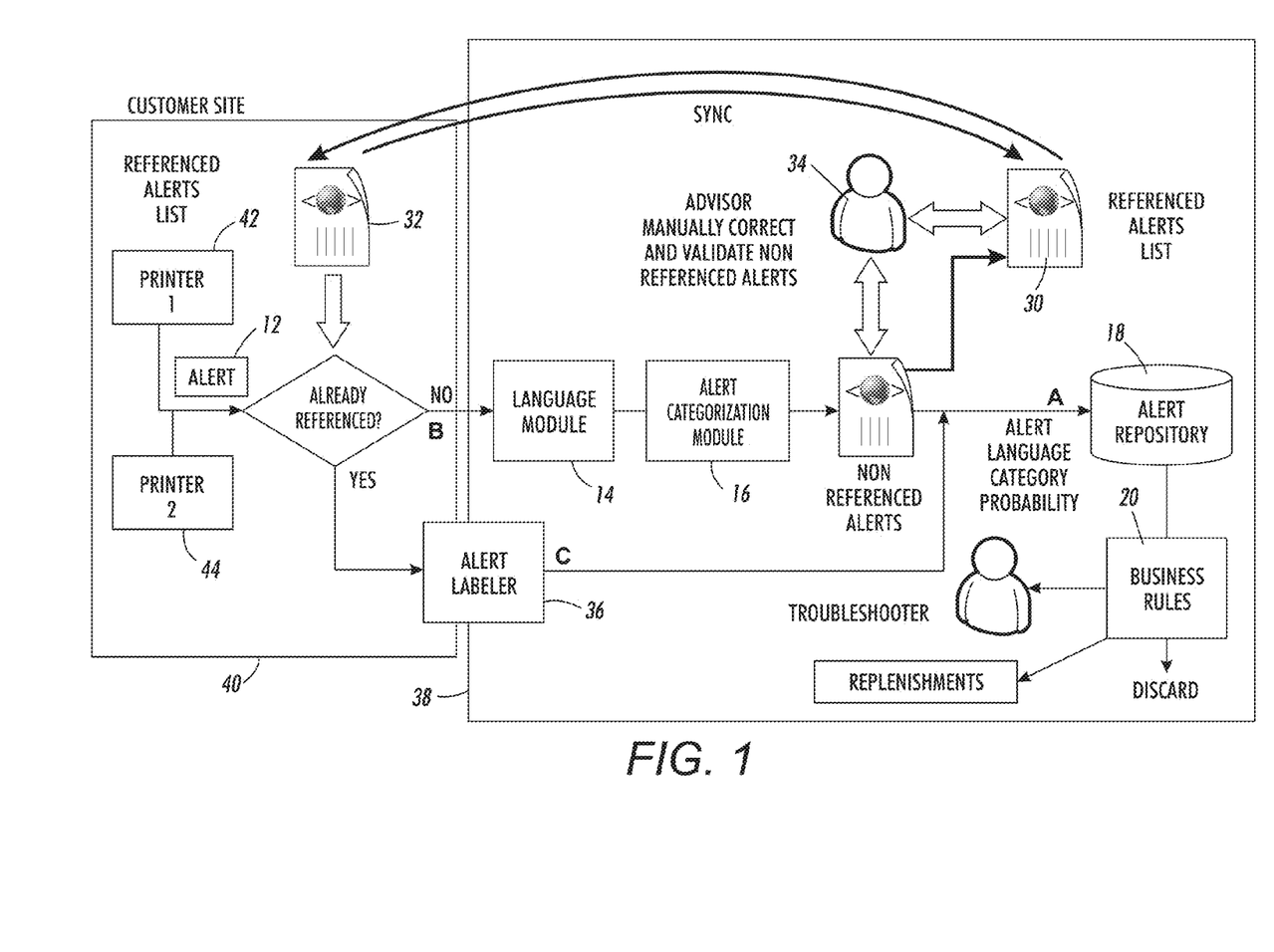
FIG. 1 is an overview of a system and method for handling device alerts.

The present embodiment is directed toward an alert processing system and method for handling device alerts. FIG. 1 provides an overview of the system and method.

The system 10 is adapted receive and process alert messages ("alerts") 12. The alerts are electronic messages which use predefined codes and text to define a problem with a device outputting the alert. Each alert includes a textual alert description in a natural language, such as English or French, which can be understood by a human operator. To improve handling of the alerts, the exemplary system includes a language module 14 to identify a language of the alert textual description and, if needed, to translate it into a selected language. In particular, the language module 14 is adapted to identify a probable source language of the received alert description and translate the alert description from that language into a target language. The system also includes an alert categorization module 16 to categorize the alerts according to an alert categorization model or "taxonomy". The alert categorization module 16 categorizes the translated description as being in one of a predetermined set of alert categories. The translated alert together with its language and category probabilities can be stored in an alert repository 18 to be subsequently processed with business rules 20 which determine how the alert is to be handled, e.g., sent to a troubleshooter, sent to a replenishment department for automated replenishment of consumables, or discarded, based at least in part on the category assigned.

The system 10 may be adapted to handle large batches of incoming alerts and/or repetitive alerts by comparing each alert description with a referenced alerts list 30, a copy 32 of which may be maintained by the customer for local filtering of alerts. For an alert description that is determined as having been previously referenced in the referenced alerts list 30, 32, an alert labeler 36 of the system is configured for associating the alert 12 with a category previously assigned to a referenced alert without needing to use the categorization module. For a new and/or unreferenced alert, the alert categorization module 16 uses a categorization routine to process the alert description. The system is further adapted to update the categorization model 16 and the referenced alerts list 30, 32 based on new categorized alert descriptions that have been manually validated.

As used herein, an 'unreferenced alert description' refers to an alert description that has not previously been observed by the alert processing system 10. The unreferenced alert description and its category are not yet incorporated in the existing referenced alerts list 30, 32. A 'referenced alert description' refers to an alert description that has been previously processed by the system and has been assigned a category by the categorization module 16. The referenced alert description is incorporated into the reference list 30, together with its category. This may be an automated step or involve manual validation by an advisor 34. The updates to the referenced alerts list 30 are propagated to the customer copy 32 when the two lists are synchronized.

A 'source language' is a language in which the alert description is received, e.g., at a service provider site 38, from a customer site 40 where the alerts are generated by electromechanical devices 42, 44. Or, the alert description may be received from an intermediate routing system (not shown) in communication with the customer site. The exemplary intermediate routing system can be hosted by a server and may manage printing environments for a number of customer sites located in, for example, different countries. The alert processing system may be a multilingual system that is adapted to receive batches of alerts in different languages, depending on a location of the customer site. A 'target language' refers to a language of the categorization model. More specifically, the alert processing system is adapted to translate the alert description from its source language to the target language for purposes of categorizing the alert using the categorization model and for ease of handling thereafter.

Figure 2A:
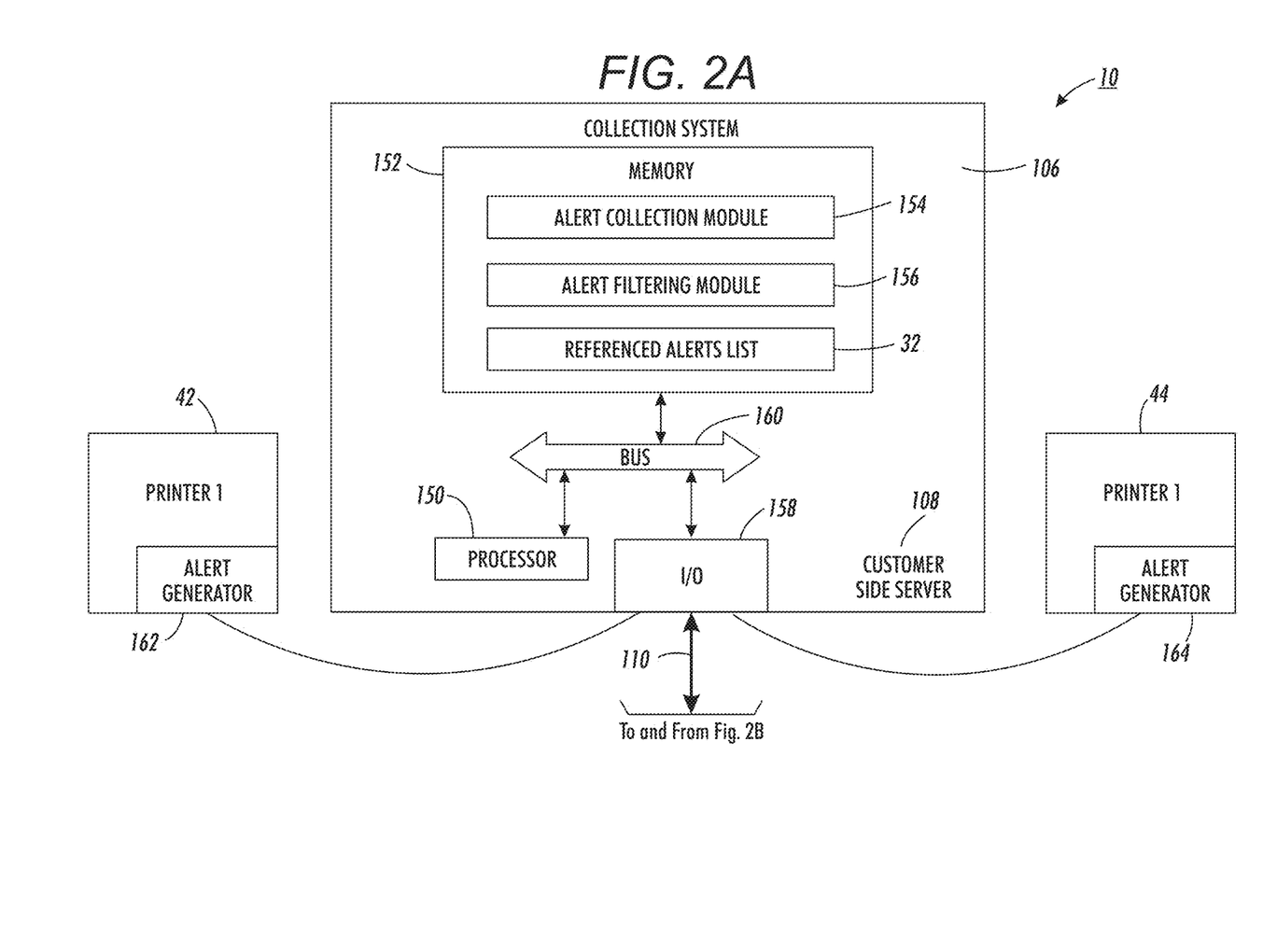
FIG. 2A shows a first part of the system and FIG. 2B shows a second part of the system.
Figure 2B:
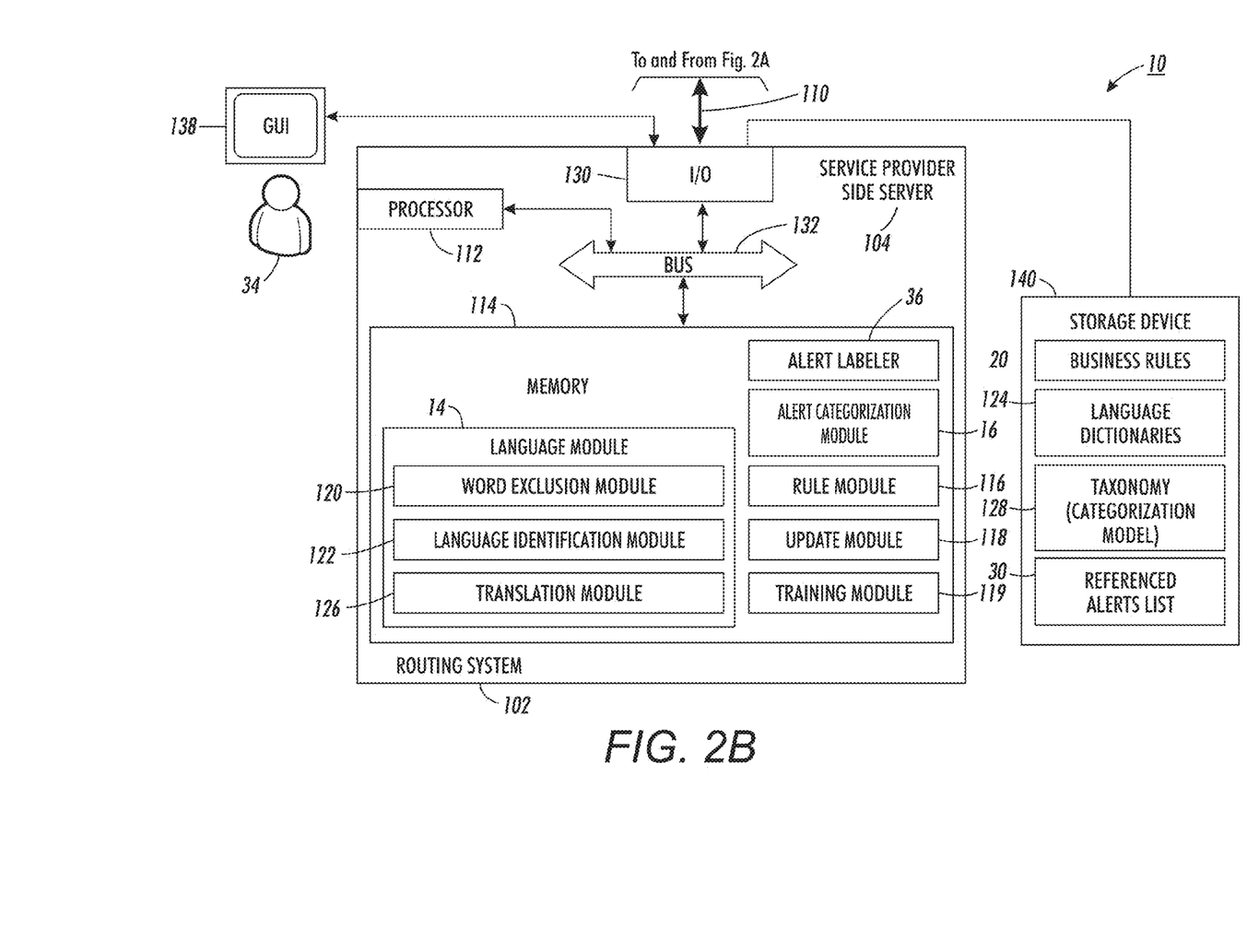

FIG. 2 is a functional block diagram of an alert processing system 10 in one exemplary embodiment. The system 10 may include a routing system 102, hosted by a computing device 104, such as a server computer at the service provider site 38, and collection system 106, hosted by a computing device 108 at the customer site, such as the illustrated server, which are linked together by communication links 110, referred to herein as a network. These components are described in greater detail below.

The routing system 102 illustrated in FIG. 2 includes a processor 112, which controls the overall operation of the routing system 102 by execution of processing instructions, which are stored in memory 114 connected to the processor 112.

The device alerts handling and categorization disclosed herein is performed by the processor 112 according to the instructions stored in the memory 114. In particular, the memory 114 stores language module 14, alert categorization module 16, alert labeler 36, a rule module 116 which applies business rules 20, an update module 118, which updates the referenced alerts list, and a training module 119 for training and periodically retraining the categorization module.

The illustrated language module 14 includes a word exclusion module 120, which identifies a set of words derived from an alert description related to a condition of a printer, a language identification module 122, which identifies a language of the alert description, for example, by comparing each word in the set of words with a plurality of stored dictionaries 124 for identifying at least one source language of the word and for translating the set of words to a target language; and a translation module 126, which translates the alert description into the target language used by the categorization module 16.

The word exclusion module 120 sanitizes the text with the help of some routines of regular expressions. The whole text is subjected to a series of pattern matching and special characters filtering regular expressions to sanitize the text and identify a remaining set of words to be input to the language identification module.

The alert categorization module 16 compares the set of words, in the target language, to a categorization model 128 and, based on the comparison, categorizes and assigns the alert description to one of a predetermined set of alert categories. The alert labeler 36 labels the alert based on the assigned category.

The update module 118 generates and updates the referenced alerts list 30 and optionally also the categorization model 128. The modules 14, 16, 36, 116, 118 will be later described with reference to the method. The alert descriptions undergo processing according to the various modules for generating an instruction for attending to the alert.

The training module 119 uses manually-labeled alert descriptions and words extracted therefrom to train the categorization module and periodically retrains the categorization module based on updates to the referenced alerts list.

The routing system 102 also includes one or more communication interfaces (I/O), such as network interfaces 130 for communicating with external devices, such as customer side server 108. The various hardware components 112, 114, 130 of the routing system 102 may all be connected by a bus 132.

With continued reference to FIG. 2, the routing system 102 is communicatively linked to a user interface device (GUI) 138 via a wired and/or wireless link. In various embodiments, the user interface device 138 may include one or more of a display device, for displaying information to users, such as an unreferenced alert description and a determined rule to a human operator 34 for review, and a user input device, such as a keyboard or touch or writable screen, for inputting instructions and/or receiving a validation and/or correction provided by the operator 34, and/or a cursor control device, such as a mouse, trackball, or the like, for communicating user input information and command selections to the processor 112. Specifically, the user interface device 138 includes at least one of an input device and an output device, both of which include hardware, and which are communicatively linked with the server 104 via wired and/or wireless link(s).

With continued reference to FIG. 2, the device alerts handling system 10 includes a storage device 140 that is part of or in communication with the routing system 102. In one embodiment, the routing system 102 can be in communication with a server (not shown) that hosts storage device 140, for storing a plurality of dictionaries 124, the referenced alerts list 30, the categorization model 128, and/or business rules 20.

The routing system 102 of the devices alert handling system 100 is communicatively linked with the alert collection system 106 via link 110. The collection system 106 includes a processor 150 and memory 152, and/or has access to a storage device such as storage device 140, for storing software modules executable by the processor 150. Memory 152 stores software instructions for implementing the customer-side parts of the exemplary method shown in FIGS. 3, 4, 6 and/or 7. In particular, the instructions include an alert collection module 154, which acquires device alerts from the printers 42, 44 and transmits a batch of the device alerts to the routing system 102; and a filtering module 156, which filters the alert descriptions based on the referenced alerts list 32 and internal business rules to identify alert descriptions to be sent to the routing system 102. These modules 154, 156 will be later described with reference to the exemplary method. The alert collection system 106 further includes a communication interface (I/O) 158 including hardware and/or software suitable for providing wired or wireless data communication with the routing system 102 and printer devices 42, 44. The memory 152, processor 150, and communication interface 158 are communicatively linked by a bus 160.

While the server 108 may be linked to as few as one printer, in general, it is linked to a fleet of printers. The exemplary printers 42, 44 may each include a marking engine, which applies marking medium, such as ink or toner, to a substrate, such as paper, using, for example, a laser, inkjet, thermal, or other transfer process. The printer renders images on print media, such as paper, and can be a copier, laser printer, bookmaking machine, facsimile machine, or a multifunction machine (which includes one or more functions such as scanning, printing, archiving, emailing, and faxing). In other embodiments, the devices 42, 44 may be any other type of electromechanical device that undergoes monitoring and/or servicing, such as a heating and cooling unit, refrigerator, dishwasher, or the like. Each device 42, 44 includes an alert generator 162, 164 which outputs an alert when it determines that the host device is experiencing a problem which cannot be handled by the device itself. This may include a need for replacement consumables, such as ink or toner in the case of a printer, or a fault which is experienced by the device.

The memory 114, 140, 152, may represent any type of tangible computer readable medium such as random access memory (RAM), read only memory (ROM), magnetic disk or tape, optical disk, flash memory, or holographic memory. In one embodiment, the memory 114, 140, 152 may each comprise a combination of random access memory and read only memory. The digital processors 112, 150 can each be variously embodied, such as by a single-core processor, a dual-core processor (or more generally by a multiple-core processor), a digital processor and cooperating math coprocessor, a digital controller, or the like. The digital processors 112, 150 in addition to controlling the operation of the respective routing system 102 or collection system 106, executes instructions stored in memory 114, 152 for performing the parts of the method outlined below.

The software modules as used herein, are intended to encompass any collection or set of instructions executable by the routing system 102 or collection system 106 so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 130, 158 may include, for example, a modem, a router, a cable, and/or Ethernet port, etc.

As will be appreciated, while two computing devices 104, 106 are illustrated by way of example, the system 10 may be hosted by fewer or more linked computing devices. Each computing device may include, for example, a server computer, desktop, laptop, or tablet computer, smartphone or any other computing device capable of implementing the method described herein.

Figure 3:
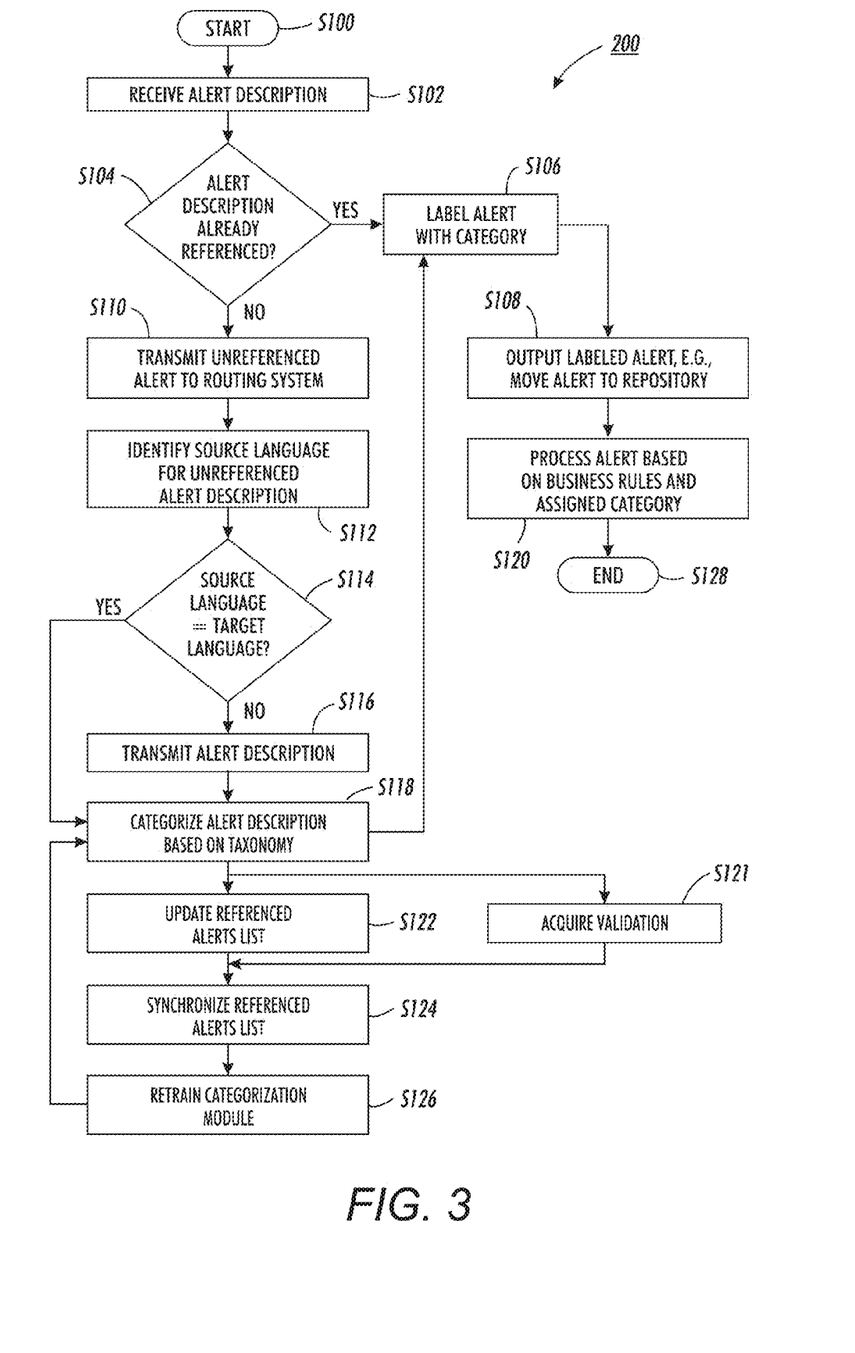
FIG. 3 is a flow chart illustrating an exemplary method for handling device alerts according to another aspect of the exemplary embodiment.

FIG. 3 is a general overview of an exemplary method 200 for handling device alerts according to one embodiment. The method starts at S100. At S102, one or more alert descriptions are received by a remote device, e.g., at the customer side server. The alert description is evaluated (S104) to determine if it is already referenced by comparing it to the client side reference alerts list 32 using the filtering module 156. If it is, it may be labeled with a category at S106 and transmitted to the repository as a referenced alert (S108). Otherwise, if not referenced, the unreferenced alert is transmitted to the routing system (S110). In other embodiments, steps S104-S106 may be performed by the routing system 102. In some embodiments, the remote device can include a printer 42, 44 and/or other electromechanical device from which the alert description originates. The original alert description is generated in a source language at the printer 42 or 44. Alert descriptions can come in multiple languages depending on the configuration of the printer.

At S112, e.g., at the routing system 102, a source language is identified for the alert description. This may include extracting a sequence of words from the alert description in the source language, e.g., by word exclusion module 120, and assigning a most probable language using the language dictionaries 124, e.g., by language identification module 122. The language identification module 122 can assign a tag to the alert description indicating the most probable language. At S114, a determination is made as to whether the identified source language is the target language. If not, at S116, the sequence of words is translated into the target language using translation module 126. The target language can include the language used in the categorization model 128 and/or the language used by the call center. If the source language is the target language, translation is not needed and the method proceeds directly to S118.

At S118, the translated alert description in the target language is categorized by the categorization module 16, based on the categorization model (taxonomy) 128 to determine a category of the alert description.

The method proceeds to S106, where the alert description is labeled with a label. The label includes the most probable category of the taxonomy 128 and can further include a confidence score in that category, or for a set of categories. The labeled alert is output, e.g., moved to the repository 18 (S108). At S120, the alerts in the repository 18 may be processed by the rule module 119 based on the category using business rules 20 and may be routed based on the output of the processing. The routing system 102 may determine an appropriate response for addressing the alert based on the tag. Additionally, at S122, the categorized alert description may be added to the referenced alerts list, automatically by update module 118 and/or with manual validation/correction (S121). At S124, the service provider referenced alerts list 30 is synchronized periodically with the corresponding list 32 on the client side by update module 118, to be used at S104 on subsequent alert descriptions. At S126, the categorization module 16 may be retrained based on manually validated/corrected alert descriptions. The method ends at S128.

Figure 4:
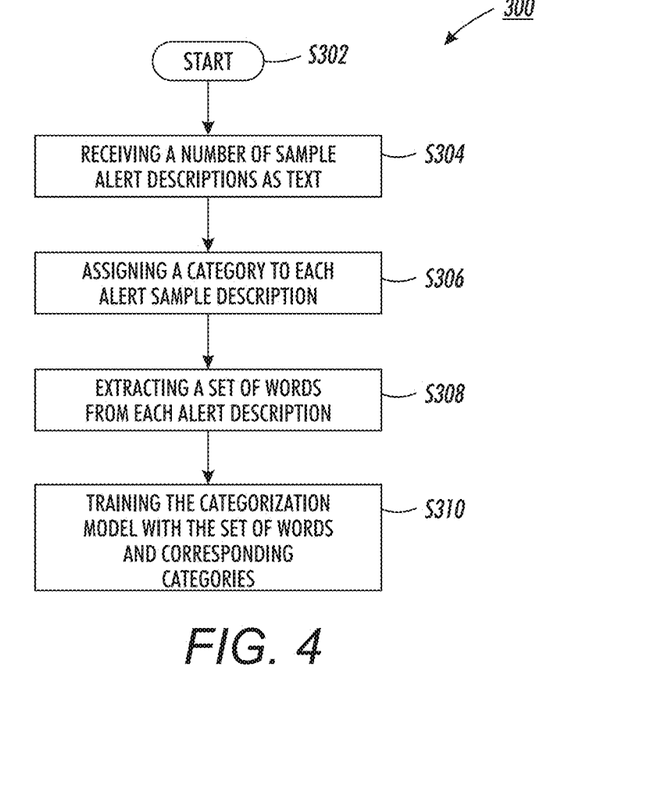
FIG. 4 is a flow chart illustrating an exemplary training method in one aspect of the exemplary method.
Figure 5:
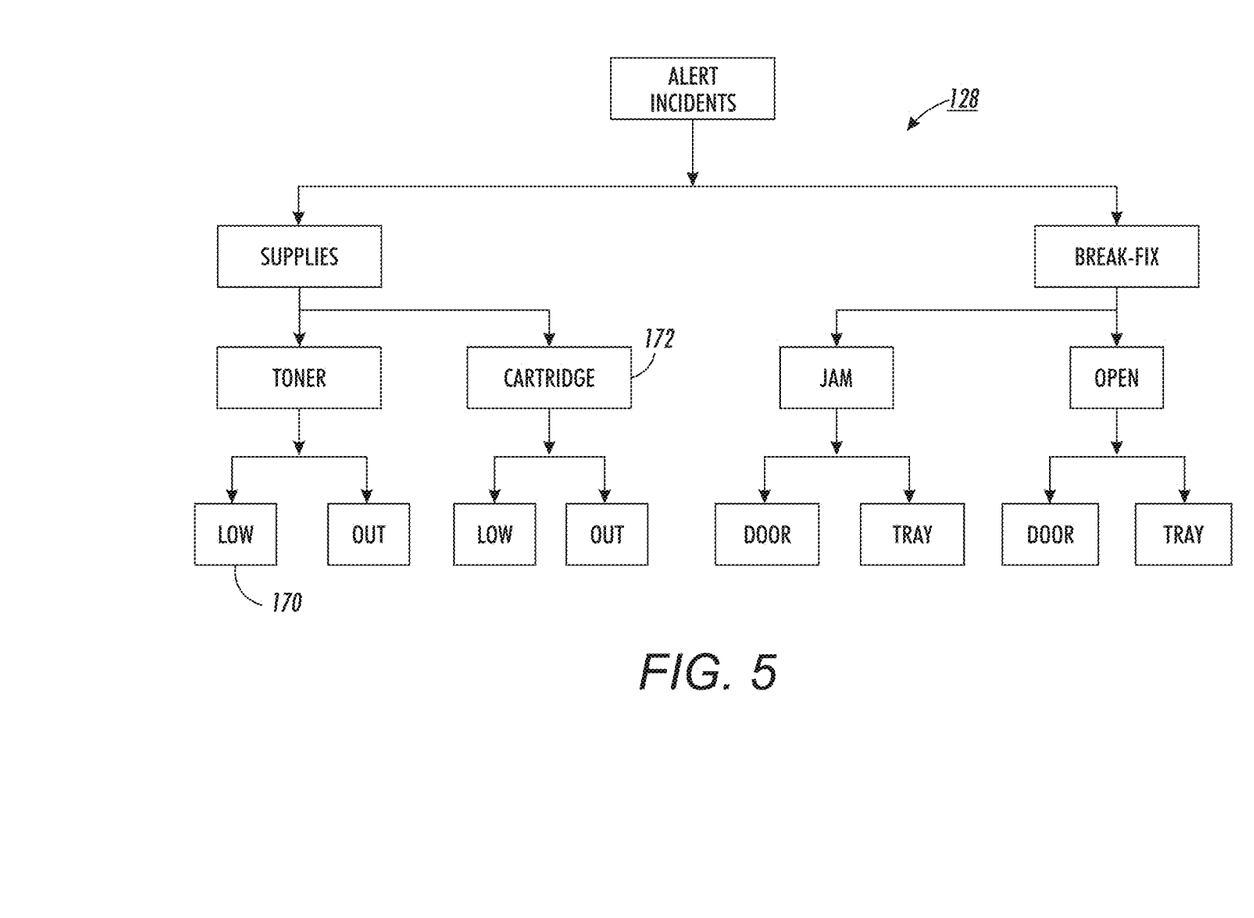
FIG. 5 is an example of an alert classification taxonomy according to another aspect of the exemplary embodiment.

FIG. 4 is a flow chart illustrating an exemplary method 300 for training the categorization module 16 according to one embodiment. It is assumed that a taxonomy 128 has already been developed, for example, as illustrated in FIG. 5. The method starts at S302. The method for handling device alerts relies on a trained categorization module that may be adapted to be continuously and/or selectively updated (shown at S126 in FIG. 3). At S304, a number of sample alert descriptions is received by the categorization module. These may be received from customers representing the types of alerts to be handled and if in a source language different from the target language, have been translated with the translation module. Each of the sample alert descriptions is manually labeled according to a category 170, 172 in the taxonomy at S306. Each sample alert description may be manually categorized (S306) into an alert category as defined by a set of different categories that are agreed upon by the customer and the service provider. At S308, a set of words is extracted from the sample alert description. This step may include filtering out computer readable codes and other non-textual information which commonly is associated with the alert description. This step may be performed as described with reference to S402, FIG. 6. At S310, the remaining set of words extracted from each alert sample description and corresponding category is used to train the categorization module. In particular, the categorizer learns to assign each word in the remaining set of words of an alert description to a given category in the taxonomy (or probabilistically over all categories) and based on these assignments, to assign an overall category to the alert description. Exemplary methods for categorizer learning which may be used herein are described in U.S. Pub. No. 20070005340 and the references cited therein, the disclosures of which are incorporated herein by reference. The training of the sample alert descriptions ends at S320.

As will be appreciated, training and/or retraining of the categorization module 16 can be periodically performed after the system processes a number of unreferenced alert descriptions. For example, the system processes unreferenced alert descriptions and assigns a category to each unreferenced alert description according to the process set forth in FIG. 3. The system may then determine if a manual validation was received when the referenced alert list was updated (S121, S122 in FIG. 3). For a newly categorized alert description that received a manual validation, the validated alert description can be used to retrain the categorization model. In the case of an unreferenced alert description that is categorized without a manual validation, the previously labeled sample alert descriptions may simply be updated in the referenced alerts list. The sample alert descriptions can be included in the retraining of the categorization model.

The specific business needs of the customer may be reflected in the various categories 170, 172, etc. in taxonomy. The categories each correspond to rules for addressing the multiple types of alerts that a printer, used by the customer, is anticipated to generate. The example alert categorization model shown in FIG. 5 is intended to be illustrative only. Moreover, while FIG. 5 illustrates a hierarchical taxonomy, it may be in the form of a list or other data structure.

In one embodiment, the categorization model can be routinely cross-validated using a controlled set of training and test alert sets that establish a validity of the model. These training and text alerts can also monitor a health of the categorization model.

The referenced alerts list 30 may be adapted to store previously validated knowledge about alerts. Certain alerts that are acquired by the routing system 102 or collection system 106 can contain information that is not useful for purposes of addressing the alert. The system can also receive alerts that are repetitive and/or contain redundant information. The referenced list of alerts contains alert descriptions that have been previously categorized (and optionally validated) by the system 10. Alerts which are repetitive can be filtered out by filtering module 156. Architecturally, the referenced alerts list can be maintained either at the customer side or at service provider's side, or both. Placing the list at service provider's side is advantageous in completely keeping it in sync with the alert repository but poses a challenge of putting high load in the network and server when alert traffic is at peak. Placing this list on the customer's side allows filtering out all most of the redundancies in the alerts such that only the non-referenced alerts are sent to the service provider's site for alert categorization. When the list is maintained at both sites, synchronization should be fairly frequent to avoid already referenced alerts being sent for processing unnecessarily by the categorization module.

The categories of alerts that have not previously been referenced can be cross-validated at S121 using their alert sample descriptions and added to the referenced alerts list at S122. The descriptions then become referenced alert descriptions which can be compared with the alert descriptions from new alerts, (either before or after translation) to determine whether the new alert are referenced or not. These alerts can also be used for subsequent updating to the categorization model using their alert descriptions.

Figure 6:
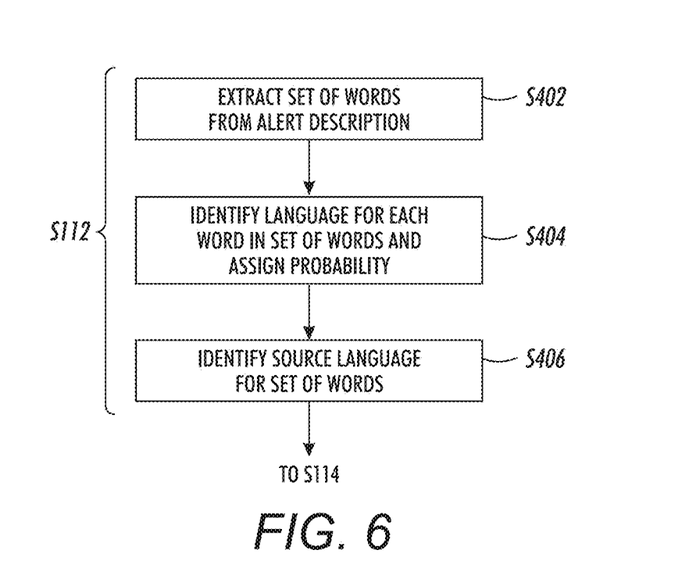
FIG. 6 is a flow chart illustrating an exemplary method for identifying a source language of a device alert according to one aspect of the exemplary method.

FIG. 6 is a flow chart illustrating S112, which includes identifying an alert language. At S402, a set of words is extracted from the alert description. In particular the text of the alert description can be filtered to remove any appended, non-useful information, such as, for example, error/codes and special characters, etc. In one contemplated embodiment, words, such as articles (e.g., 'a', 'the'), conjunctions (e.g., 'for', 'and'), and adpositions (e.g., 'of', 'to', 'in', 'on', 'by'), and other superfluous language, etc., that does not identify the substantive nature of the alert can be discarded.

The filtering can be performed using routines of regular expressions known in the art, such as by a pattern matching process and special character filtering. This filtering can be performed at the customer-side or at the routing system 102. The remaining words in the set can be treated as a bag of words BOW), i.e., without reference to their order in the alert description.

At S404 a language is identified for each word in the BOW. In particular, for each of the plurality of words in the sequence of words, at least one source language is identified. More specifically, each word in the BOW is compared with the language dictionaries 124 stored in the storage device 140. A word which appears in a dictionary may be tagged with that language. Thus a word may be tagged with 0, 1, 2 or more languages, depending on the dictionaries in which it appears. A probability may be associated with each word for each language. For example, a word tagged with English and French may be assigned a 50% probability for each language. The probable nature of the word (according to the taxonomy) may also be detected, with an assigned probability.

At S406, a single source language is determined for the alert description as a whole, based on the language tags/probabilities assigned to the words. The source language having the highest probability overall is assigned to the sequence of words. In other words, the source language of the alert description is determined using aggregated maxima of the individual word probabilities.

The method then proceeds to S114, where the set of words is translated from the identified source language to the target language when the source language is different from the target language. Each word from the BOW is translated to the target language using an appropriate stored cross language dictionary for the identified source language. In one contemplated embodiment, the target language can be English. However, all the languages supported by the disclosed system 10 can form the language taxonomy. This modular approach enables the system 10 to be scalable in terms of changes made to the number of supported languages and categories.

It is assumed that the set of words derived from the alert description can relate to a condition of a printer device. In one example, the set of words can indicate a status of at least one component of the printer device. The alert description then proceeds to the categorization workflow.

Figure 7:
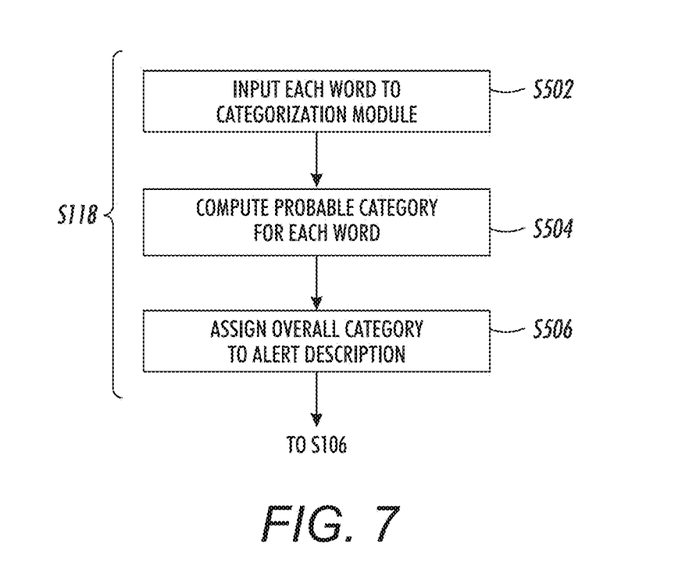
FIG. 7 is a flow chart illustrating an exemplary method for categorizing a device alert according to one aspect of the exemplary method.

With reference now to FIG. 7, the categorization step S118 can proceed as follows. At S502, the set of words, now in the target language, is input to the categorization module. Each word in the BOW is assigned to a category or probabilistically over all categories of the categorization model at S504. At S506, an overall category is assigned to the alert description, based on the assigned categories/probabilities for the individual words in the BOW. For example, the categorization module computes probabilities for the different categories and the category having the highest maximum probability is assigned to the unreferenced alert description. The method then proceeds to S106, where the alert description is tagged with the assigned category. A business rule 20 for addressing the alert may be defined in memory for each category in the taxonomy and appended to the alert description by the rule module 116. For example, an alert description tagged with the category "toner low" may be sent to the replenishments function in the service provider site for generating a request for a new toner cartridge.

Returning to S104 of the method, the BOW method can also be used to determine whether an alert is already referenced. For example, the customer side filtering module 156 may extract a bag of words from each new alert received and compare it to a bag of words associated with each referenced alert in the referenced alerts list. If there is a match, the new alert is tagged with the same category as the already referenced alert and considered as a referenced alert. The system then assigns the category to the alert description. In this way, a business rule 20 for addressing the alert can be associated to the alert description based on the determined category.

One aspect of the disclosure relates to computation of a metric that is used to track and maintain efficient performance of the system by updating (e.g., intermittently or periodically) the referenced alerts list 30. At S122, the update module 118 of the routing system 102 computes the metric for determining whether the system 10 should perform an update. The unreferenced alert descriptions can be appended into the reference alerts list after a certain number of alert descriptions are processed. In this manner, the categorization model can be retrained and/or updated to include the referenced alert descriptions in the reference list for the processing of subsequent alerts acquired by the system 10. After a selected number of alert categorization routines are performed, the update module 118 computes a value for determining whether the referenced alerts list 30 needs to be updated. The decision can be a function of the proportion of alerts processed by the categorization module. Looking at FIG. 1, for example, the total number of alerts proceed is represented by the alerts passing along path A. This total includes the number of alerts processed by the categorization module that pass along path B plus the number which do not need processing, and which bypass the categorization module along path C. This value can be represented by the equation:

$$\text{Coverage metric} = 1 - \frac{\text{Number of Alerts passing through Alert Categorization Routine}}{\text{Total Number of Alerts processed}} \quad (1)$$

The value is compared to a predetermined threshold. If the threshold is met, the referenced alerts list 30 is updated automatically or the advisor 34 may be prompted to perform a manual validation of the newly categorized alert descriptions to evaluate whether they have been correctly labeled. The advisor validates the labels, correcting them if necessary, and proves an appropriate signal to the update module to perform the update. The advisor 34 is experienced in the particular taxonomy and types of alerts received.

In certain embodiments the metric can be calculated for a selected customer or a selected printer. The threshold can therefore vary between different customers and the service provider(s). Each calculation is adapted to provide usage patterns and profile information corresponding to specific customers and devices.

In one contemplated embodiment, the validation is performed after a categorization model is generated and/or updated. In another contemplated embodiment, the validation is performed before generating and updating the categorization model. The system provides the advisor 34 with the alert descriptions that were automatically categorized by the system. The alert description and the corresponding tag are provided to the advisor 34 for validation. The advisor 34 analyzes the assigned category for correctness. However, embodiments are contemplated that automatically determine a measure of correctness. The system acquires one of a validation of the tag and correction to the tag. In the contemplated embodiment, the system can acquire this validation and correction as operator-provided input. In some cases, the corrected labels may be applied to the non-referenced alerts already stored in the alert repository 18. However, in general, the advisor may review only a portion of the alerts and their category labels for correctness. Based on the one of the acquired validation and correction, the referenced alert is associated with a rule for responding to the alert description. After the validation is complete, the validated alerts are added to the existing reference alerts list.

Returning to FIG. 3, at S124, the routing system update module synchronizes the validated/corrected alert descriptions added to the referenced alerts list with the customer side alerts list.

In one contemplated embodiment, the system 10 can store the unreferenced alert description in the alert repository 18 until the validated/corrected alert descriptions can be synchronized with the updated reference list stored at the server 104. Subsequent alerts that are acquired by the system 10 can be tagged without undergoing a conventional probabilistic method.

In S120 of the exemplary method, for each alert description that is categorized by the system 10, the category tag is compared to a set of business rules at for determining a rule corresponding to the tag. Rules can be provided in multiple forms and can be based on, for example, direct text comparison, predetermined priorities, and thresholds. The alert is then addressed according to the determined rule. Example rules can instruct the service provider to troubleshoot a problem occurring at the printer, supply replenishment for a low-level resource, and/or discard the alert. In some embodiments, an operator, such as a troubleshooter at the service provider attends to the alert based on the determined rule.

One aspect of the embodiments disclosed herein is a system that filters redundant alerts, thus enabling alerts of higher importance to be processed more expediently.

Another aspect is a system that automatically categorizes alerts on a regular basis based on a customized categorization model that is agreed upon between a customer and a service provider. In this manner, the costs of analyzing device alerts can be reduced and the health/resource levels of the printer can be more accurately monitored and forecast. Furthermore, the system enables service providers to be more pre-emptive in determining the health of printing device and its resources levels. In this manner, the service provider can quickly ship replenishments and/or send technical assistance to the customer site when an alert indicates a low-level resource or a component malfunction.

Another aspect relates to a referenced alerts list 30 that can acquire previously validated knowledge about alerts. The referenced alerts list 30 can provide an expedient, text-based method for comparing an acquired alert description to the referenced alerts list 30, thus enabling a more immediate categorization of a new alert description, without the need for categorization with the categorization module.

Another aspect relate to the computation of a metric for ascertaining an overall quality of the system.

A further aspect relates to a multilingual system that is adapted to categorize alerts acquired in multiple languages.

Another aspect relates to a system that is adapted to train probabilistic models with a predefined taxonomy. The taxonomy provides for greater flexibility and reduced maintenance.

Although the method illustrated in FIGS. 3, 4, 6 and 7 are illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 10, wherein the disclosure is not limited to the specific applications and embodiments illustrated and described herein.

The method illustrated in one or more of FIGS. 3, 4, 6 and 7 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown FIGS. 3, 4, 6 and/or 7, can be used to implement the method.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An alert processing system comprising:
a communication interlace adapted to receive at least one alert description in a natural language of an alert message output by an associated device, the alert description defining a problem with the associated device;
an alert filtering module adapted to:
access a stored referenced alerts list to determine if the alert description corresponds to one of a set of previously referenced alert descriptions,
when the alert description is determined to correspond to a previously referenced alert description, labeling the alert description with the label of the corresponding previously referenced alert description, and
when the alert description is determined not to correspond to any of the previously referenced alert descriptions, labeling the alert description as an unreferenced alert description;
a word exclusion module adapted to extract a set of words from the alert description related to a condition of the associated device;
an alert categorization module adapted to categorize the alert description, when it has been labeled as unreferenced by the alert filtering module, into to one of a predetermined set of alert categories of a categorization model based on the extracted set of words; a language module adapted to:
compare each word in the set of words with a plurality of stored dictionaries in different languages for identifying at least one source language of the word,
assign a source language to the set of words based on the identified source languages of the words, and
translate the set of words from the assigned source language to a target language; and
a processor adapted to implement the modules.

2. The alert processing system of claim 1, wherein the condition indicates a status of at least one component of the associated device.

3. The alert processing system of claim 1, wherein the associated device comprises a printer.

4. The alert processing system of claim 1, wherein the word exclusion module includes instructions for removing selected content from the alert description, the selected content being selected from the group consisting of: error codes; special characters; appended content; articles; conjunctions; adpositions; and combinations thereof.

5. The alert processing system of claim 1, wherein the categorization module is trained to categorize sets of words in the target language.

6. The alert processing system of claim 1, further comprising a rule module adapted to:
determine a rule corresponding to the alert description based on the categorization.

7. The alert processing system of claim 1, further comprising an update module adapted to:
provide the categorized alert description to an advisor for review;
acquire one of a validation and correction provided by the advisor; and
based on the one of the acquired validation and correction, add the categorized alert description to a referenced alerts list.

8. The system of claim 7, wherein further comprising a training module for retraining the categorization module at intervals based on the categorized alert descriptions added to the referenced alerts list.

9. The alert processing system of claim 1, wherein the system receives alerts generated by a set of devices, the associated device being one of the set.

10. A method for processing alerts transmitted by at least one device, the method comprising:
training a categorization model, comprising:
receiving sample alert descriptions as text, the sample alert descriptions being representative of types of new alerts to be processed by the trained categorization model, and receiving a manually-assigned category in a predefined taxonomy for each sample alert description,
extracting a set of words from each sample alert description, and
training the categorization model with the set of words and the manually-assigned category of each of the sample alert descriptions to assign each word in a remaining set of words of a new alert description to a given category in the taxonomy or probabilistically over all categories and based on the word assignments, to assign an overall category to the new alert description;
receiving at least one new alert, transmitted by the at least one device, the new alert using predefined codes and text to define a problem with the associated device outputting the new alert, the new alert including a new alert description in a natural language;
extracting a set of words from the new alert description related to a condition of the associated device;
with a processor, categorizing the new alert description into to one of the predetermined set of alert categories with the trained categorization model, based on the extracted set of words from the new alert description, and outputting the categorized alert description.

11. The method of claim 10, further comprising:

accessing a stored referenced alerts list to determine if the alert description corresponds to one of a set of previously referenced alert descriptions;

for an alert description determined as not corresponding to any of the previously referenced alert descriptions, labeling the alert description as an unreferenced alert description to be processed by the categorization module; and for an alert description determined to correspond to a previously referenced alert description, labeling the alert description with the label of the corresponding previously referenced alert description such that the alert description is not processed by the categorization module.

12. The method of claim 10, further including:

assigning a label to the new alert description based on the alert category; and identifying a rule for handling the alert based on the label.

13. The method of claim 12, further including responding to the new alert description based on the rule.

14. The method of claim 10, further comprising identifying a source language for the new alert description and translating the alert description form the source language to a target language in which the categorization is performed.

15. The method of claim 14, wherein the identifying the source language comprises:

comparing each word in the set of words with each of a plurality of dictionaries, each dictionary being in a respective language, to determine if the word is present in the dictionary;

computing a probable source language based on the comparing; and assigning the probable source language to the set of words.

16. An alert processing system for handing device alerts, the system comprising:

memory which stores instructions for performing the method of claim 10 and a processor, in communication with the memory for executing the instructions.

17. A computer program product comprising a non-transitory recording medium which stores instructions for performing the method of claim 10.

18. The method of claim 10, wherein the extracting a set of words from each sample alert description includes filtering out computer-readable codes.

19. A system for processing device alerts transmitted from an associated device, the system comprising:

memory storing:

a plurality of dictionaries each corresponding to a respective one of a set of source languages, and a language module for identifying a source language of a new alert description by comparing each of a set of words extracted from the new alert description to each of the dictionaries and, where the source language is not a target language, translating the set of words from the source language to the target language;

a categorization module trained on sets of words from labeled prior alert descriptions, the words being in a target language, the categorization module assigning a category to the new alert description based on the set of words extracted from the new alert description in the target language; and an update module which updates a referenced alerts list based on optionally manually validated assigned categories of a plurality of alert descriptions processed by the categorization module, the plurality of alert descriptions including the new alert description, the referenced alerts list being provided to an associated filtering module for assigning categories to uncategorized alert descriptions without using the categorization module; and a processor in communication with the memory for implementing the modules.

20. The system of claim 19, wherein the memory further stores:

a set of rules for responding to the new alert description; and a rule module for identifying one of the set of rules for handling the alert based on the categorization.

* * * * *